INVENTOR.
MARLO J. LARSON
ATTORNEY.

INVENTOR.
MARLO J. LARSON
BY Roger W. Jensen
ATTORNEY.

INVENTOR.
MARLO J. LARSON

ATTORNEY.

United States Patent Office 3,174,099
Patented Mar. 16, 1965

3,174,099
AUTOMATICALLY CONTROLLED NUCLEAR
MAGNETIC RESONANCE FREQUENCY
SWEEP OSCILLATING DETECTOR DEVICE
Marlo J. Larson, Circle Pines, Minn., assignor to
Honeywell Inc., a corporation of Delaware
Filed Feb. 28, 1962, Ser. No. 176,372
24 Claims. (Cl. 324—.5)

This application is a continuation in part of a prior application 131,797, filed August 16, 1961, in the name of the present inventor Marlo J. Larson and assigned to the same assignee as the present application and now abandoned.

This invention pertains generally to nuclear resonance involving nuclear resonant circuitry and more specifically to nuclear magnetic resonant circuitry using automatic frequency control in the tracking portion and having optional automatic search circuitry to quickly reacquire the NMR (Nuclear Magnetic Resonance) signal if for any reason it disappears.

Many prior NMR oscillators required laborious hand operations to find the resonant frequency and to keep track of the frequency due to changes in magnetic field or changes in frequency of the oscillator. Other apparatus such as the C. W. Pinkley Patent 2,960,650, while having a readout and automatic frequency control, is limited to applications where the magnetic field can be varied and still does not provide the features of automatic search such as provided in this invention in case the NMR signal is lost.

Briefly the operation of one embodiment of this invention involves modulating a radio frequency oscillatory with a low frequency signal and comparing a reference point on the low frequency modulation signal with the time at which alternate NMR signals are generated to produce a square wave pulse which is of a width proportional to the time difference between the reference point on the low frequency signal and the time of the occurrence of the NMR signal. The pulse width modulated square wave is then fed into an integrating circuit which provides a D.C. signal output level indicative of the width of the square wave pulse. The D.C. signal is used to control the high frequency oscillator and thereby correct any deviation in the center frequency of the oscillator from the resonant frequency of the material being tested or being utilized to test some other phenomenon. In addition, another circuit monitors the occurrence of the NMR signal and if the NMR signal does not appear for several times in succession, this detection circuit will switch in a low frequency search signal which will modulate the NMR oscillator over a wide range to pick up the NMR signal again. As soon as the signal appears the detection circuit will switch out the search signal and allow the square wave circuitry to control the frequency of the radio frequency oscillator.

Another embodiment of this invention utilizes a circuit which is quite simple compared to the aforementioned circuit while still utilizing the advantages of automatic frequency control. In this second embodiment approximately one-third the components are required with only a small decrease in convenience. By merely shorting to ground the feedback signal and tuning the tank circuit of the oscillator, adjustments can be made until a signal is observed on an oscilloscope and then the short to ground can be removed. The circuit will then function automatically until some shift in the environment is more rapid than the circuit can follow. It is also disclosed in this application how to change this second embodiment to provide automatic search control and thereby find the signal produced by the resonating nuclei in the test material without having to short the feedback signal to ground. Even with the automatic search features added to this embodiment it is less complex than the first mentioned embodiment.

Another variation of a variable frequency oscillator is also shown in this application. This oscillator is used as a marginal oscillator in part of the detection circuitry. The unique feature of this oscillator is the use of a variable capacitance semiconductor element in one of the feedback legs of the oscillator to provide a nearly constant amplitude output signal. This is a great improvement over prior art oscillators which change in amplitude as their frequency of oscillation is varied. By keeping the amplitude of oscillation at a nearly constant value, the detection circuitry can work more accurately and more effectively since sudden changes in frequency will not produce the change in amplitude previously obtained and thereby possibly produce a false output signal.

It is an object of this invention to provide a new and novel means of obtaining automatic frequency control for determining nuclear resonant frequency of material for both electric quadrupole resonance and magnetic resonance.

Another object of this invention is to provide a novel method of automatic search in the event the condition being measured changes so suddenly that the nuclear resonant signal is lost to the automatic frequency control and sweep circuits.

A further object of this invention is to provide a simple and relatively inexpensive automatic nuclear resonance detection circuit.

Another object is to provide a novel method of obtaining constant amplitude in the output signal of a variable frequency oscillator.

Further objects of this invention will be ascertained from the specification and appended claims in combination with the accompanying drawings of which:

Figure 1:
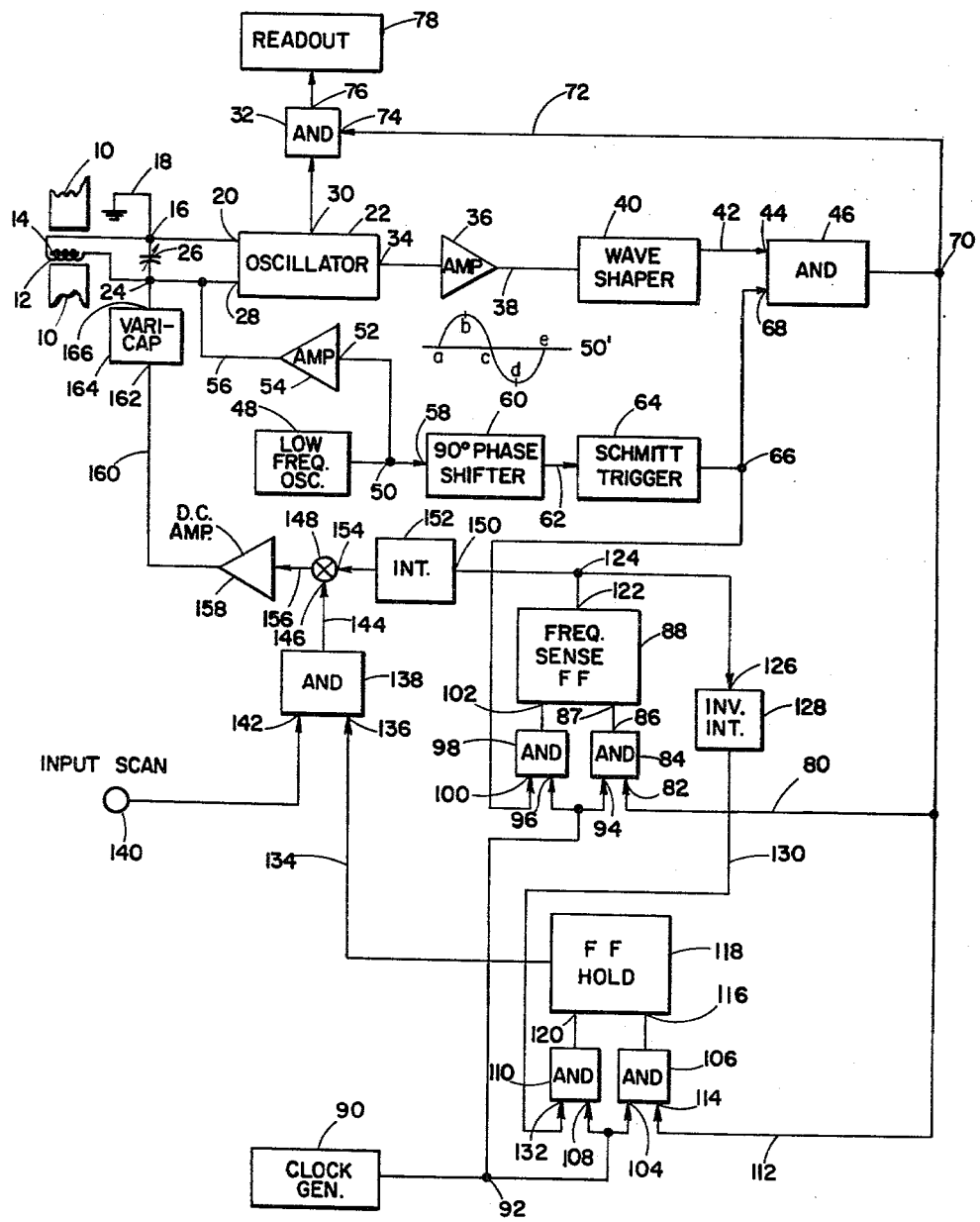
FIGURE 1 is a block diagram of the complete system.

In FIGURE 1 magnetic field producing elements 10 produce a magnetic field which completely surrounds a coil 12 and a sample of material 14. The coil 12 is connected at one end to a junction point 16 which is connected to a reference point which for convenience is referred to as ground 18 and an input 20 of an oscillator 22. The other end of the coil 12 is connected to a junction point 24. A mechanically variable capacitor 26 is connected between the junction point 16 and the junction point 24. Junction point 24 is also connected to an input 28 of the oscillator 22. An output 30 of the oscillator 22 is connected to an And circuit 32. An output 34 of the oscillator 22 is connected to an amplifier 36. The amplifier 36 is connected by a lead 38 to a wave shaper 40 which merely shapes the output signal of amplifier 36 into a square wave form. A lead 42 connects an output of the shaper 40 to an input 44 of an And circuit 46. A low frequency oscillator 48 is connected from an output to a junction point 50. A wave form of a signal 50' is shown which represents the signal appearing at junction point 50 with points a–e representing various points in time on the signal 50'. The junction point 50 is connected to an input 52 of an amplifier 54. An output of the amplifier 54 is connected by a lead 56 to the junction point 24. The junction point 50 is also connected to an input 58 of a 90° phase shifter 60. The phase shifter 60 is connected by a lead 62 to a Schmitt trigger 64. The Schmitt trigger 64 is connected at its output to a junction point 66. The junction point 66 is connected to an input 68 of the And circuit 46. An output of the And circuit 46 is connected to a junction point 70. The junction point 70 is connected by a lead 72 to an input 74 of the And circuit 32. An output 76 of the And circuit 32 is connected to an input on a readout device 78. The junction point 70 is also connected by a lead 80 to an input 82 of an And circuit 84. An output 86 of the And circuit 84 is connected to an input 87 of a frequency sensing flip flop circuit 88. A clock generator 90 has an output connected to a junction point 92. The junction point 92 is connected to an input 94 of the And circuit 84 and to an input 96 of an And circuit 98. The junction point 66 is connected to another input 100 of the And circuit 98. An output of the And circuit 98 is connected to an input 102 of the frequency sensing flip flop circuit 88. The junction point 92 is also connected to an input 104 of an And circuit 106 and to an input 108 of an And circuit 110. The junction point 70 is connected by a lead 112 to an input 114 of the And circuit 106. An output of the And circuit 106 is connected to an input 116 of a hold flip flop circuit 118. An output of the And circuit 110 is connected to another input 120 of the hold flip flop circuit 118. An output 122 of the frequency sensing flip flop circuit 88 is connected to a junction point 124 and from there to an input 126 of an inverter-integrator circuit 128. An output of the inverter-integrator 128 is connected by a lead 130 to another input 132 of the And circuit 110. An output of the hold flip flop circuit 118 is connected by a lead 134 to an input 136 of an And circuit 138. An input scan or search terminal 140 is connected to an input 142 of the And circuit 138. An output of the And circuit 138 is connected by a lead 144 to an input 146 of a summing means 148. The junction point 124 is also connected to an input 150 of an integrating circuit 152. An output of the integrating circuit 152 is connected to an input 154 of the summing means 148. An output of the summing means 148 is connected by a lead 156 to an input of a direct current amplifier 158. An output of the direct current amplifier 158 is connected by a lead 160 to an input 162 of a variable capacitor circuit 164. An output 166 of the variable capacitor circuit 164 is connected to the junction point 24.

Figure 2:
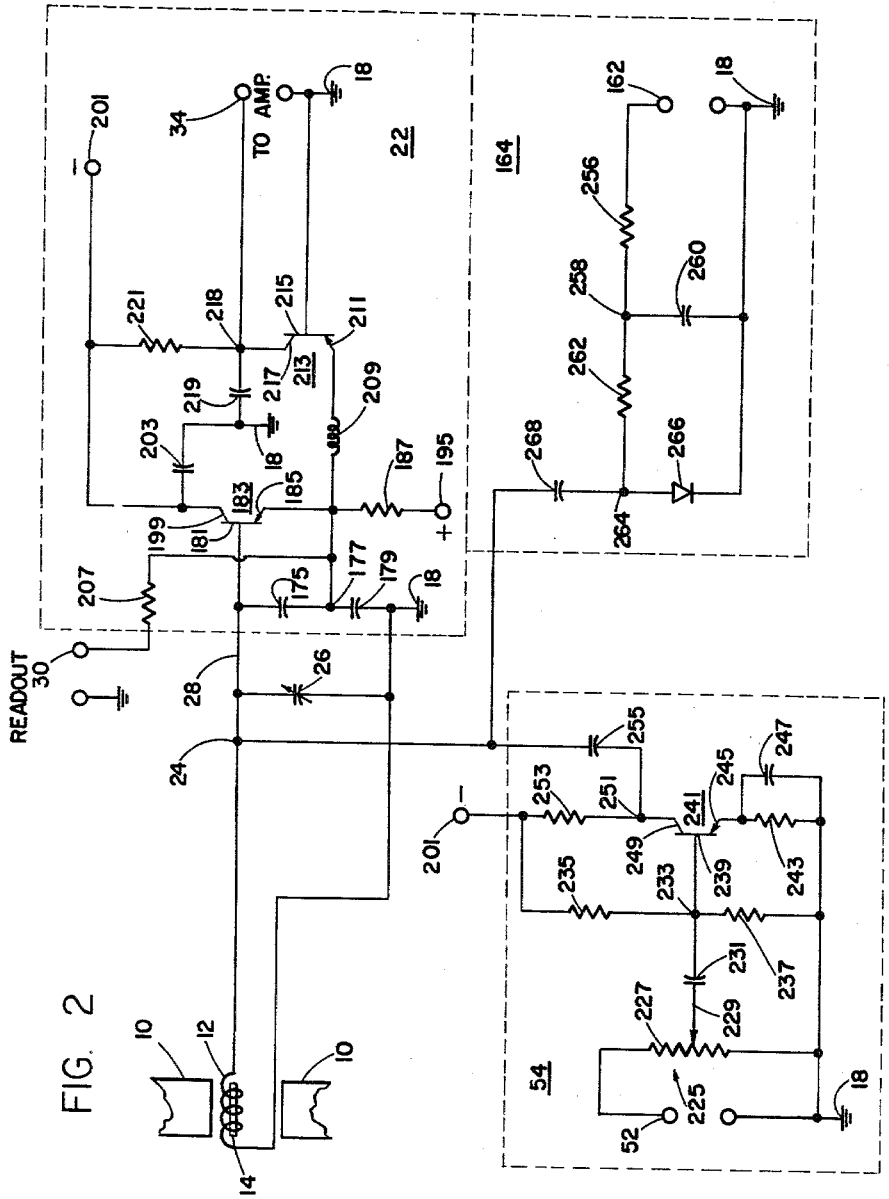
FIGURE 2 is the schematic diagram of a radio-frequency oscillator in combination with a probe, a variable capacitor semiconductor and an amplifier for frequency modulating the radio frequency signal.

In FIGURE 2 the similar components are numbered identical to that used in FIGURE 1. The magnetic field producing elements are again numbered 10 with the coil being 12 and the material being tested 14. An output from the oscillator 22 (contained within the dashed lines) is numbered 30 which goes to the And circuit 32. Another output terminal 34 is shown which goes to the amplifier 36. An input to the variable capacitor circuit is shown as 162. Another input coming from the low frequency oscillator is shown as input 52 to the amplifier 54 (within the dashed lines). The mechanically variable capacitor designated as 26 is connected to the junction point 24 and to the input lead 28 of the oscillator 22. The variable capacitor smoothing filter circuit is shown within the dashed lines 164. A capacitor 175 is shown connected between the input lead 28 of the oscillator 22 and a junction point 177. Another capacitor 179 is shown connected between the junction point 177 and ground 18. The input lead 28 is connected to a base 181 of an electric valve means or PNP transistor 183. An emitter 185 of the transistor 183 is connected to the junction point 177. A resistive element 187 is connected between the junction point 177 and a positive power terminal 195. A collector 199 of the transistor 183 is connected to a negative power terminal 201 and also to one lead or plate of a capacitive element 203 which has its other lead or plate connected to ground 18. A resistance element 207 is connected between the output terminal 30 which goes to the readout 78 and the junction point 177. An inductive coil 209 is connected between the junction point 177 and an emitter 211 of an electric valve means or PNP transistor means 213. A base 215 of the transistor 213 is connected to ground 18. A collector 217 of transistor 213 is connected to a junction point 218 and also to the output terminal 34. The junction point 218 is also connected to one lead of a capacitive element 219. The other lead of element 219 is connected to ground 18. A resistance element 221 is connected between the negative power supply terminal 201 and the junction point 218.

Within the amplifier 54, shown in FIGURE 2, a potentiometer 225, which has a resistance element 227, is shown with one lead of the resistance element 227 connected to the input terminal 52 and the other end of the resistance element 227 connected to ground 18. A wiper 229 of the potentiometer 225 is connected to one lead or plate of a capacitive element 231. The other lead or plate of the capacitive element 231 is connected to a junction point 233. A resistance element 235 is shown connected between the negative power terminal 201 and the junction point 233. Another resistance element 237 is connected between the junction point 233 and ground 18. The junction point 233 is also connected to a base 239 of an electric valve means or PNP transistor 241. A resistive element 243 is connected between an emitter 245 of the transistor 241 and ground 18. A capacitive element 247 is connected in parallel with the resistive element 243. A collector 249 of the transistor 241 is connected to a junction point 251. A resistive element 253 is connected between the negative power terminal 201 and the junction point 251. A capacitive element 255 is connected between the junction point 251 and the junction point 24 which is connected to the input 28 of the oscillator 22.

The automatic frequency control circuit shown as a block numbered generally 164 in FIGURE 2 is shown with an input lead 162 which comes from the direct current amplifier. A resistive element 256 is connected between a junction point 258 and the input terminal 162. A capacitive element 260 is connected between the junction point 258 and ground 18. Another resistive element 262 is connected between a junction point 264 and the junction point 258. A voltage variable capacitive semiconductive element means sometimes called a Varicap 266 is connected between the junction point 264 and ground 18. A capacitive element 268 is connected between the junction point 264 and the junction point 24 which is connected to the input 28 of the oscillator 22. The resistive elements 262 and 256 along with the capacitor 260 provide filtering to filter out any high frequency noise on the input signal and to apply only D.C. signals to the Varicap 266.

Figure 3:
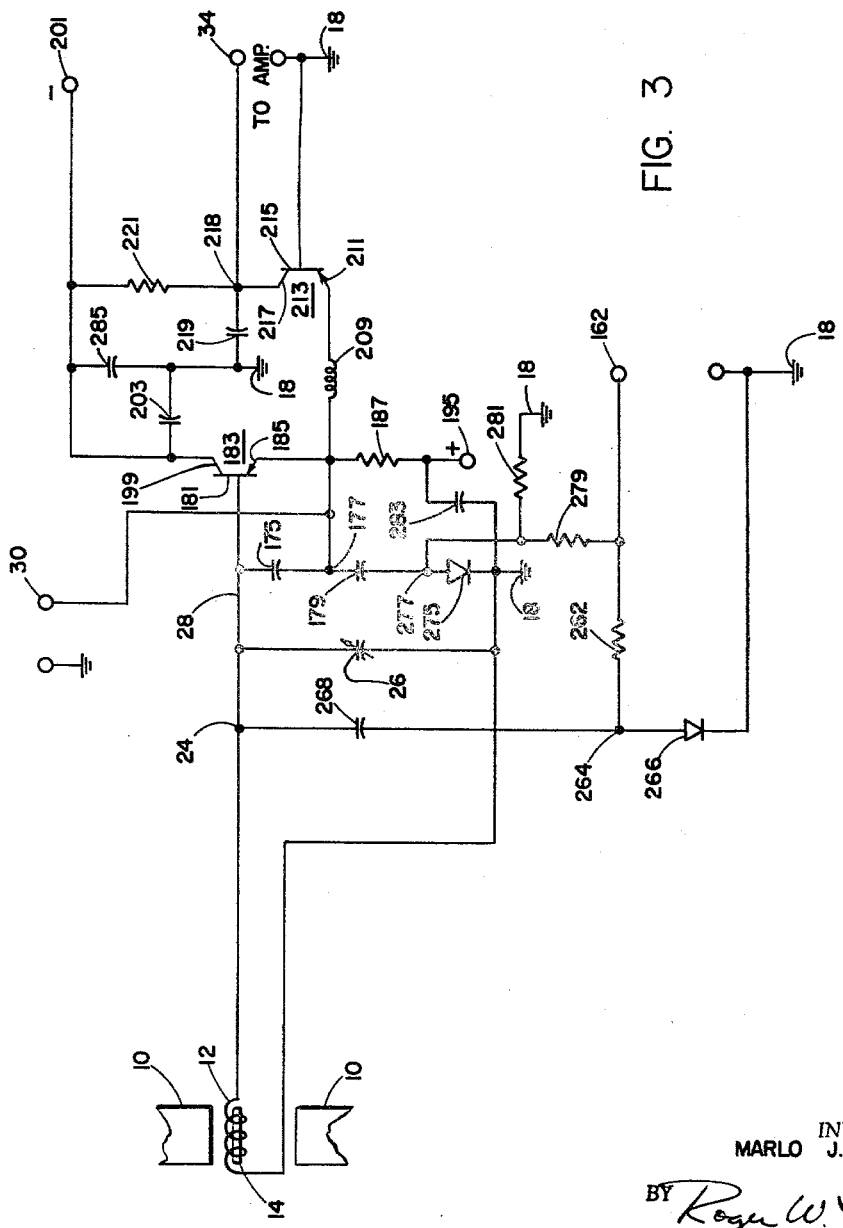
FIGURE 3 is a schematic of an improved radio frequency oscillator in combination with a probe utilizing in addition to the circuit shown in FIGURE 2 a variable capacitance semiconductor element which provides a nearly constant output amplitude signal.

In FIGURE 3 all the components similar to those shown in FIGURE 2 are numbered the same and only the added components will be described in this paragraph. A variable capacitance semiconductor diode element 275 is connected between ground 18 and a junction point 277 which is connected to the end of the capacitor 179 previously connected to ground 18. A resistance element 279 is connected between the junction point 277 and the input terminal 162. Another resistance element 281 is connected between the junction point 277 and ground 18. A capacitive element 283 is connected between the positive power terminal 195 and ground 18. Another capacitive element 285 is connected between the negative power terminal 201 and ground 18. Capacitive element 285 is in parallel with capacitive element 283 previously shown in FIGURE 2. In the actual circuit, the two capacitive elements 203 and 285 are required to pass all the frequency components of the noise signals to ground. The tantalum capacitor 203 used in one embodiment had enough inductance that it had to be bypassed to ground with capacitor 285.

In one embodiment of the invention the following circuit values were used to obtain a working model of the oscillator shown in FIGURE 3.

| | |
|---|---|
| Material in container 14 | Water. |
| Capacitor 26 | 0 to 50 micromicrofarads. |
| Capacitors 175 and 268 | 68 micromicrofarads. |
| Capacitor 179 | 180 micromicrofarads. |
| Capacitors 203, 219 and 283 | 0.1 microfarads. |
| Capacitor 285 | 330 micromicrofarads. |
| Inductance 209 | 200 microhenries. |
| Transistors 183 and 213 | 2N393. |
| Diode 266 | Hughes HC 7006. |
| Diode 275 | Hughes HC 7001. |
| Resistor 187 | 1000 ohms. |
| Resistor 221 | 5100 ohms. |
| Resistor 262 | 7800 ohms. |
| Resistor 279 | 10,000 ohms. |
| Resistor 281 | 3000 ohms. |

Figures 4, 6:
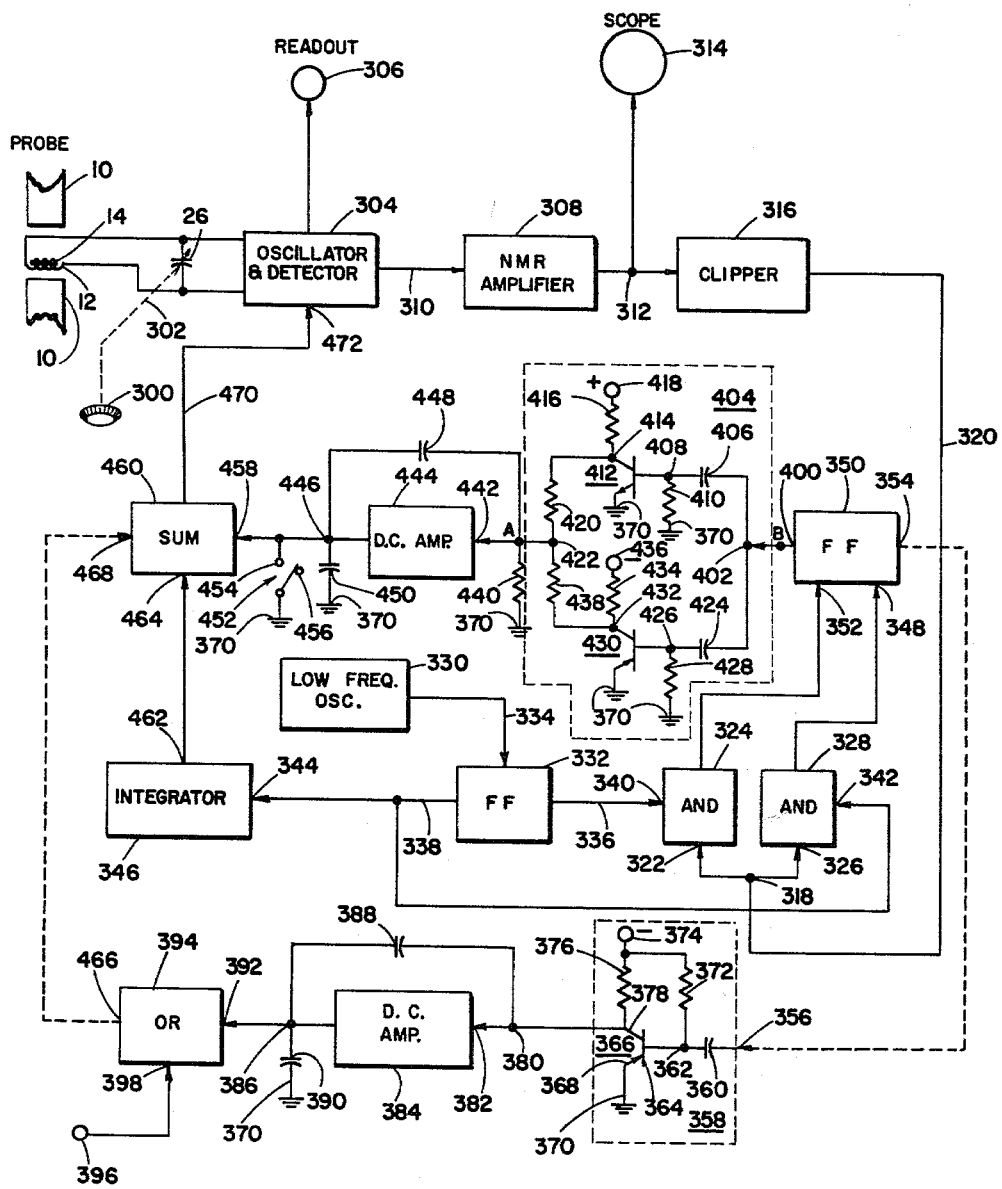
FIGURE 4 is a block diagram of another embodiment and is a simplified version of the nuclear resonance detector.
FIGURE 6 is a shorting connection which may be used in FIGURE 4 to provide an optional unit.

In FIGURE 4 a control knob 300 is connected by a mechanical connection 302 to the variable capacitive element 26 previously mentioned. The capacitive element 26 is connected across an oscillator-detector circuit 304. The capacitive element 26 is also connected across the ends or leads of the inductance portion of the probe 12 also previously mentioned. The probe 12 is situated between the magnetic field producing members 10. An output of oscillator detector circuit 304 is connected to a readout terminal 306. A NMR amplifier 308 is connected to receive a signal from the oscillator circuit 304 by a lead 310. An output of the amplifier 308 is connected to a junction point 312. An oscilloscope 314 is connected to the junction point 312 to provide a means for observing signals obtained when the nuclei of the test material resonate. The junction point 312 is also connected to provide a signal to a clipper circuit 316. An output of the clipper circuit 316 is connected to a junction point 318 by a lead 320. The junction point 318 is connected to an input 322 of an And circuit 324 and also to an input 326 of an And circuit 328. A low frequency oscillator 330 is connected to a flip flop circuit 332 by a lead 334. The flip flop circuit 332 provides output signals on leads 336 and 338 which are of opposite phase. The lead 336 is connected to an input 340 of the And circuit 324. The lead 338 is connected to an input 342 of the And circuit 328. The lead 338 is also connected to an input 344 of a generator or integrating means 346. An output of the And circuit 328 is connected to an input 348 of a flip flop or switching circuit 350. An output of the And circuit 324 is connected to another input 352 of the flip flop circuit 350. An output 354 of the flip flop circuit 350 is connected to an input 356 of a detection circuit generally designated as 358 and contained within the dashed lines. The connection from 354 to 356 is in dashed lines to indicate the automatic detection and search features which are optional circuitry. The input lead 356 is connected to one lead or plate of a capacitive element 360. Another lead or plate of the capacitive element 360 is connected to a junction point 362. The junction point 362 is connected to a base 364 of a PNP transistor or electric valve means 366 which has an emitter 368 connected to ground 370. A resistive element 372 is connected between the junction point 362 and a negative power terminal 374. A resistive element 376 is connected between the power terminal 374 and a collector 378 of the transistor 366. The collector 378 of the transistor 366 is connected to an output of the circuit 358 and from there to a junction point 380. The junction point 380 is connected to an input 382 of a D.C. amplifier 384. The circuit for the amplifier 384 can be the same as shown on page 2 of a tentative data sheet by Philco, Form number LTC 278C and printed in May 1959. This data sheet provides the description of the 2N207 germanium transistors. An output of the D.C. amplifier 384 is connected to a junction point 386. A capacitor 388 is connected between the junction points 380 and 386. Another capacitive element 390 is connected between the junction point 386 and ground 370. The amplifier 384 in combination with the capacitive elements 388 and 390 provide an integrating means or integrating amplifier. The junction point 386 is also connected to an input 392 of an OR circuit 394. An input or search terminal 396 is connected to another input 398 of the OR circuit 394. The flip flop 350 has another output 400 connected to a junction point B and another junction point 402. If it is desired, the output 354 and 400 of flip flop 350 can be identical or in other words obtained from the same source with minor variations in the phasing of the detection circuitry described above. The junction point 402 is an input terminal for a circuit generally designated as detection circuit 404. A capacitive element 406 is connected between the junction point 402 and a junction point 408. A resistive element 410 is connected between the junction point 408 and ground 370. A base of an NPN transistor or electric valve means 412 is also connected to the junction point 408. An emitter of the transistor 412 is connected to ground 370. A collector of transistor 412 is connected to a junction point 414. A resistive element 416 is connected between the junction point 414 and a positive power terminal 418. A resistive element 420 is connected between the junction point 414 and a junction point 422. Junction point 422 is also an output lead of the detection circuit 404 and is connected to a junction point A. Another capacitive element 424 is connected between the junction point 402 and a junction point 426. A resistive element 428 is connected between the junction point 426 and ground 370. A base of a PNP transistor or electric valve means 430 is connected to the junction point 426. An emitter of the transistor 430 is connected to ground 370. A collector of the transistor 430 is connected to a junction point 432. A resistive element 434 is connected between the junction point 432 and a negative power terminal 436. A resistive element 438 is connected between the junction point 432 and the junction point 422. A resistive element 440 is connected between the junction point A and ground 370. Junction A is also connected to an input 442 of a D.C. amplifier 444. The amplifier 444 may be identical to the amplifier 384. An output of the amplifier 444 is connected to a junction point 446. A capacitive element 448 is connected between the input 442 of the amplifier 444 and the junction point 446.

Another capacitive element 450 is connected between the junction point 446 and ground 370. Shorting or switching means 452 has a normally open first contact 454 connected to the junction point 446 and a normally closed second contact 456. A switch arm means of the switch 452 is permanently connected to ground 370 and normally provides electrical connection from the contact 456 to ground 370. When the switching means 452 is operated, it will momentarily connect the contact 454 to ground and will return to contact 456 as a normal position. The junction point 446 is also connected to an input 458 of a summing circuit or summing means 460. An output 462 of the integrating means 346 is connected to an input 464 of the summing means 460. An output 466 of the OR circuit 394 is connected by a dashed optional lead to another input 468 of the summing circuit 460. An output of the summing circuit 460 is connected by a lead 470 to an input 472 of the oscillator and detector circuit 304. Input 472 corresponds to input 162 in FIGURE 3.

Figure 5:
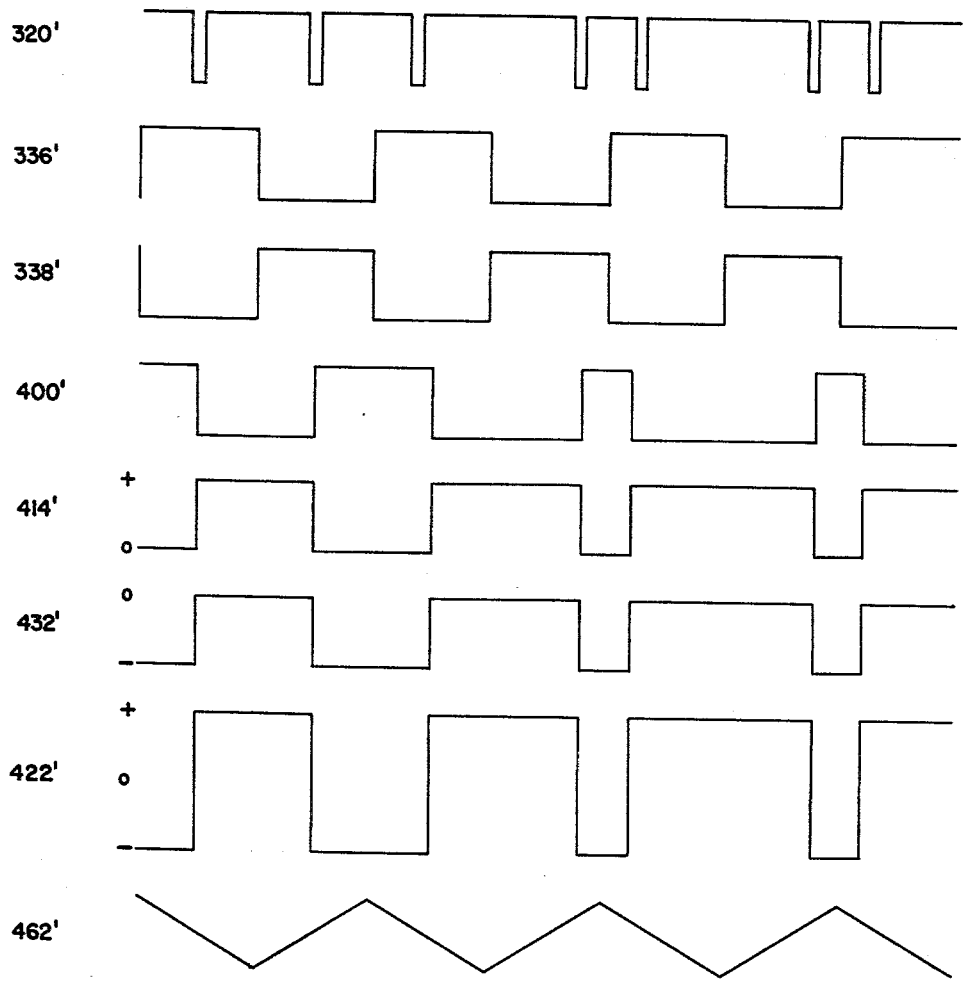
FIGURE 5 is a drawing showing the wave forms of the signals at different points in FIGURE 4.

In FIGURE 5 the numbers with primes refer to the identical number without the prime indication in FIGURE 4 and thereby show the wave forms obtained at these points. As an example, wave form 320' is a sample of what may be obtained at the output of clipper 316 on lead 320. The next two wave forms 336' and 338' show the output signals obtained from the flip flop circuit 332. The next wave form shown is 400' and is obtained from the output of the flip flop circuit 350. The next signals 414' and 432' show the wave forms obtained at the collector leads of the transistors 412 and 430 in the detector circuit 404. The next wave form is that obtained at the output 422 of the detection circuit 404. The remaining wave form 462 is that obtained from the output of the generating or integrating means 346.

FIGURE 6 provides an alternate circuit for another embodiment of FIGURE 4. As indicated detection circuit 404 can be removed and replaced by a shorting wire connected between junction points A and B.

*Operation*

In order to better understand the operation of the block diagram it will be helpful to examine first the circuit shown in FIGURE 2. Within the dashed lines generally indicated as 22 is a circuit very much like a standard Colpitts oscillator. In this circuit the transistor 183 provides the amplification and the probe 12 along with the capacitors 175, 179 and 26 form a tank circuit and a feedback network. In most Colpitts oscillators the feedback circuit is the same as the capacitive elements of the tank circuits, however, in this particular circuit the two are separated. This circuit, using the probe 12 as part of the tank circuit, will oscillate at a given frequency and the output of the oscillator appears at junction point 177. The output of this oscillator is applied through a radio frequency filter coil 209 to the emitter of a common base amplifier which will detect only direct current changes at the junction point 177. The output of this common base amplifier is then applied to the junction point 34 and then to the high gain amplifier which is utilized to provide signals observable on an oscilloscope and to provide a large enough signal to be usable in controlling the frequency of the oscillator as will be discussed later. In operation the oscillator will oscillate at a given frequency. This frequency is being modulated as will be explained later and, when the sample 14 within the probe 12 has a frequency applied to it which is the same as its resonant frequency, the tank circuit is loaded down and this appears as added resistance in the tank circuit. This added resistance lowers the amplitude of oscillation of the oscillator. In lowering the amplitude of oscillation of the oscillator, the junction point 177 raises in voltage and since this rise is not as high frequency a rise as the oscillation of the oscillator, this change in amplitude is passed through the coil 209 so that an output appears at the terminal 34.

As soon as the frequency of the oscillator passes the resonant frequency of the sample 14, the amplitude of oscillations increases and the trailing edge of the pulse indicative of resonance appears at terminal 34. Two pulses will appear at terminal 34 for each cycle of modulation of the frequency of the oscillator since the oscillator will pass the resonant frequency of the material 14 both on increase in frequency and on the downward slope of decreasing frequency.

The low frequency modulation is accomplished by applying a low frequency signal to the input terminal 52 of the amplifier within the dashed lines 54. The amplifier comprising the transistor 241 along with the associated circuitry acts as a conventional transistor amplifier and it modulates the frequency by increasing or decreasing the effective resistance in series with the capacitor 255 which is placed in parallel with the tank circuit comprising the probe coil 12 and the capacitor 26. As the transistor 241 conducts more current the junction point 251 is nearer to ground 18 and it appears that there is less resistance between junction point 251 and ground 18 so that the capacitive effect of the capacitor 255 is proportionately greater than when the transistor has very little current flow therethrough and it appears that there is a large amount of resistance between junction point 251 and ground 18. Thus, by varying the resistance placed in series with the capacitor across a tank circuit the resonant frequency of the tank circuit can be varied and thus frequency modulation of this oscillator is accomplished.

The frequency is also changed by the circuit within the dashed lines 164. A direct current signal is applied to the terminal 162 through a filter network comprised of the resistors 256 and 262 along with the capacitor 260. This filter network filters out the noise and other high frequency signals which appear from the DC amplifier. A direct current signal is thus applied to the junction point 264 to vary the voltage across the semi-conductor voltage variable capacitor 266 and thus to vary the capacitance. The Varicap 266 is essentially a back biased diode and the capacitance of this diode is proportional to the voltage applied across it in the reverse direction. With the Varicap 266 in series with the capacitor 268 and the two of them paralleled across the tank circuit of the oscillator, variation of the element 266 in capacitance can thereby further change the frequency of resonance of the tank circuit and provide additional control of frequency of the nuclear resonance oscillator 22.

The operation of the circuit shown in FIGURE 3 is substantially the same as that of FIGURE 2 if a constant bias signal is presented across the diode element 275. After the circuit shown in FIGURE 2 was designed, it was determined that the circuit 54 was not required as a separate summing circuit. The signal previously applied between terminals 52 and ground 18 was changed and applied through summing resistors to the input of the circuit 164. All the signals applied to the oscillator 22 in FIGURE 1 are thus applied through the circuit 164 and the frequency of the oscillator is changed entirely by the change in voltage across semiconductor element 266 after initial tuning of the mechanically variable capacitive element 26. As mentioned before it was found that the amplitude of oscillation of the Colpitts oscillator varied as frequency varied. The exact reason for obtaining this variation in amplitude of oscillation is not completely known, however, it is believed that the Q of the coil 12 varies with frequency and thereby provides a larger impedance to the oscillator utilizing transistor 183. With a higher impedance, the tank circuit does not require as much additional energy in each swing of the oscillator signal and provides a higher impedance load to the oscillator circuit. With a higher impedance load in the oscillator circuit, the output signal which is obtained is of a greater amplitude. The solution provided by FIGURE 3 is to place a variable capacitance semiconductor element 275 in series with the capacitor 179 in the feedback portion of the oscillator circuit. As the input signal applied to terminal 162 increases in amplitude, the capacitance of diode 266 decreases and thereby increases the frequency of oscillation. The amplitude of oscillation also appears to be dependent upon the feedback ratio or signal ratio of the portion of the feedback legs between junction points 177 and 28 compared with that across the whole feedback leg between junction points 28 and ground 18. By varying the capacitance between junction point 177 and ground 18 through the use of diode 275 the feedback ratio to the oscillator is varied. When the frequency of oscillation increases and the amplitude of oscillation attempts to increase, the decrease in capacitance and resultant increase in impedance of the diode 275 due to the increase in signal obtained from terminal 162 changes the ratio of feedback and thereby lowers the amplitude of oscillation. While the components of the embodiment which is listed do not provide perfect linearity of output amplitude with changes in frequency, the difference with and without the element 275 is very noticeable. Use of the diode 275 has provided nearly constant oscillation amplitudes and for this reason is believed to provide a novel advance in the art.

In FIGURE 1 a circuit is shown which provides automatic frequency control for the oscillator to keep its center frequency at the frequency of resonance of the material 14 within the coil 12. Also, FIGURE 1 includes a feature which provides an automatic scan operation, in the event that the frequency of resonance of the material 14 changes so drastically from the frequency of the oscillator 22 that a signal is lost. Where a field such as a magnetic field is being monitored the signal can be lost fairly easily if the magnetic field is changed rapidly such as would be the case if the magnetic field were produced by the wires running to a power supply and a heavy load were suddenly switched on to the power supply to change the current through the wires very quickly. When the system is turned on, a signal such as a triangular wave is being applied to the input terminal 140 and thus applied to the input 142 of the And circuit 138. The flip flop 118 normally produces a signal to the lead 134 unless an input is being applied at the terminal 116. Since the system has just been turned on and nuclear resonance has not been detected, an input signal would be applied to the And circuit 138 and thus to the summing circuit 148. This triangular wave is very low frequency and thus will pass through the D.C. amplifier 158 and to the input of the variable capacitor circuit 164 which has been previously explained. The variable capacitor circuit varies the effective capacitance of the tank circuit comprising the coil 12 and the capacitor 26 to slowly vary the frequency of the oscillator 22. At the same time the low frequency oscillator 48 is attempting to vary the frequency of the oscillator 22 through the amplifier 54 which has also been previously explained. The scan input however is of a much lower frequency and of a much greater amplitude than the signal being applied by the low frequency oscillator 48. As a result, the net effect is to vary the oscillator frequency 22 over a very wide range with constant deviations in frequency from a straight line due to the low frequency oscillator 48. An example of frequencies used would be 5 c.p.s. (cycles per second) for the scan frequency and 40 c.p.s. for the low frequency oscillator output. The signal applied to the scan input 140 is of a large enough amplitude to vary the frequency of the oscillator 22 over a frequency range in which it is known that resonance will occur in the nuclei of the material 14 under any conditions. When resonance occurs due to the direct combination of magnetic field and frequency being applied to the coil 12 a pulse will appear at the output of the oscillator 22 as discussed previously. This output pulse is amplified in the amplifier 36 and shaped into a square wave by the wave shaper 40. The output from the wave shaper 40 is applied to the input of And circuit 46 and if a signal is also applied at input 68 an output will appear at junction point 70. The signal output from the low frequency oscillator 48 shown as 50' is phase shifted 90° and applied to a Schmitt trigger 64. The output of the Schmitt trigger then applies an output signal to the And circuit 46 for a half cycle which timewise is between the points $b$ and $d$ on the waveform 56'. In effect this is producing a timing function since this signal also starts the frequency sensing flip flop circuit 88 to a condition to provide a signal to the integrator 152 as soon thereafter as a pulse from the high frequency clock generator 90 is applied to the input 96 of And circuit 98. The frequency sensing flip flop circuit will then switch to provide a signal to the integrator 152 at a time very close to that indicated by $b$ in the waveform 50'. The oscillator 22 will have its center frequency at the point $c$ which normally will be near the frequency of resonance of the material 14. If a pulse appears at time $c$ the signal will be applied through the And circuit 46 down to the And circuit 84 and the next time a pulse appears from clock 90 a signal will be applied to the frequency sensing flip flop 88 to turn it to an off condition. The signal from the flip flop 88 will then be a square wave equal to one quarter of a complete cycle compared to the signal from the low frequency oscillator 48. This width pulse is applied to the integrator 152 to provide a given direct current signal output for this particular width pulse. The output pulse from the And circuit 46 is also applied to the And circuit 106 and will turn the flip flop 118 to an off condition as soon as the next clock pulse appears from the clock generator 90. In turning flip flop 118 to an off condition a signal is no longer present at the And circuit 138 and the scan input signal appearing at terminal 140 is no longer present to the summing circuit 148. Therefore, the only signal being applied to the summing circuit 148 is from the integrator 152. This signal thus in the case just assumed would provide only enough voltage to the variable capacitive circuit 164 to keep the oscillator at that frequency. If however the signal indicating resonance occurred before or after the point $c$ on the waveform 50', the square wave output from the flip flop 88 would be of a width to give a lower or greater direct current signal respectively from the integrator 152. This signal would thus vary the capacitance in the variable capacitive circuit 164 to correct the frequency of the oscillator 22 toward a point nearer to resonance of the core material 14. The frequency at which resonance occurs can be sensed by an E/PUT (pulses per unit time) meter (not shown) which will give the average frequency of oscillation of the oscillator 22 or it can be obtained slightly more accurately by gating the output of the oscillator with the pulse obtained from the And circuit 46 so that an output is obtained only for a narrow band of time around the actual frequency of resonance. That is, the signal from the output 30 of the oscillator 22 will only be applied to the readout device 78 when a signal is also present at the input 74 to allow passage of the signal from the oscillator 22.

As long as there is an alternating signal due to the switching on and off of the flip flop 88 at the point 124, the signal obtained from the integrator inverter 128 is not sufficient to switch the flip flop 118 to an "on" condition. However, if the signal indicating nuclear resonance is not obtained from the oscillator 22 and thus from the And circuit 46, the frequency sensing flip flop 88 is not turned "off" and a continuous D.C. signal is applied to the junction point 124. This signal is integrated and soon becomes large enough to change the flip flop 118 to an "on" condition with the aid of the signal from the clock generator 90. This action will provide a signal to the input of the And circuit 138 along with the scan input signal applied at terminal 140 to produce a scanning action from the system so as to find the nuclear resonant frequency again. As soon as the resonant frequency is found, a signal will appear at the output of the And circuit 46 and frequency control will again be assumed to switch out the scan input signal appearing at terminal 140 as explained before.

In FIGURE 4 a signal is obtained from the oscillator in box 304 upon each occurrence of resonance of the nuclei in the material 14 contained within the probe 12 just as described in the operation of FIGURE 1. The change in amplitude of oscillation is detected and amplified by the amplifier 308 and it is there observed on the oscilloscope 314. The clipper circuit 316 clips the top of the signal off to provide a constant amplitude signal which is applied to the And circuits 324 and 328. The oscillatory signal provided by oscillator 330 is changed to a square wave form by the flip flop circuit 332 and is changed to two signals of opposite phase applied respectively to the And circuits 324 and 328. The And circuit 324 will provide a change in output signal only when both of the inputs are of the proper polarity. As can be determined from FIGURE 5 the only time during which there will be two signals applied to the And circuits is during the time that the pulse of signal 320' is obtained from the oscillator circuit 304. As can also be observed, the input signals obtained from the flip-flop circuit 332 are alternating and thus provide the proper polarity to the And circuit only during a half of each full cycle or on successive pulses of the same polarity of the signal 320'. The flip flop circuit 350 after receiving a pulse from And circuit 324 will remain with its output signal at the same polarity until it receives a further signal from And circuit 328. In other words flip flop circuit 350 is bistable and will not change its output signal until it receives an input signal on the opposite input terminal from that last received. If the output signal from the flip flop 350 remains at a constant level, the signal applied to detection circuit 358 is reduced to zero since the D.C. signal will not pass through the capacitor 360 of the detection circuit 358. As long as an alternating signal is applied to detection circuit 358 the signal passes through capacitor 360 and keeps transistor 366 in an On condition and thereby hold the junction point 378 in a near ground condition. When the input signal remains at a constant polarity for longer than a certain amount of time, the transistor 366 turns to an Off condition and the junction point 378 changes to the negative value of the prior supply. The D.C. amplifier which has been converted to an integrating circuit has a provision to counteract any constant input signal. This can be adjusted so that the near ground condition obtained as an input to means 384, when the transistor 366 is in an On condition, has no effect on the integrating portion of the circuit. When the transistor 366 changes to an Off condition because of the unipolarity input signal, the amplifier integrates the input signal in a direction to allow passage of the search signal through an OR circuit and for the summing circuit 460. Normally the D.C. amplifier or integrating circuit means 384 provides an output signal which completely cancels the effect of the search signal applied to terminal 396. The search signal applied to terminal 396 is a very low frequency and large amplitude signal in relation to other signals in the circuit and it completely over-rides any other signal. This search signal varies the frequency of oscillation of the oscillator in box 304 through a wide range of frequencies until resonance is again detected in the nuclei of material 14. When this resonance is detected, an output signal is obtained and applied through the And circuits 324 and 328 to start operation of the flip flop circuit 350 again. The resulting output signal from flip flop 350 energizes the transistor 366 and changes the output of the D.C. amplifier to prevent passage of the search signal through the OR circuit 394. The alternating signal obtained from the flip flop 350 is also applied to the detection circuit 404. When the signal from the flip flop circuit remains at a constant value, it will not pass through the input capacitors 406 and 424 and therefore no output signal is obtained and the integrating circuit utilizing amplifier 444 has no effect on the frequency of oscillation of the oscillator 304. When an alternating signal is obtained such as shown in FIGURE 5 by wave form 400', the transistors 412 and 430 are turned from an On condition to an Off condition at opposite times. Since the two transistors are complementary, their signals add to provide a resultant output signal which goes both positive and negative with respect to ground such as shown by wave form 422'. Actually this detection circuit is used to restore positive and negative polarity to the signal obtained from flip flop 350 without allowing the passage of the signal when flip flop 350 ceases to produce an alternating output signal. In the lefthand portion of FIGURE 5, the wave forms show that the nuclear resonance is occurring at the center point of the frequency variation of the oscillator 304. When this occurs, it is desired to leave the oscillator at the frequency and therefore a correction signal is unnecessary. It will be observed that the wave form 422' is completely symmetrical and the integrating circuit utilizes amplifier 444 and therefore produces no resultant output signal and therefore no correction voltage will be applied to change the frequency of the oscillator 304. In the righthand portion of FIGURE 5 it will be noticed that the NMR signals appear toward one end of the time period of changing frequency. The result of this variation from the center of the time period produces an unsymmetrical wave form at the output of the flip flop 350. This unsymmetrical wave form is shown on the righthand end of 400'. The signal is then passed through the detection circuit 404 and integrated to obtain a resultant D.C. output signal at junction point 446. The resultant D.C. output signal is summed through summing circuit 460 and changes the frequency of oscillation of the oscillator 304 to bring the NMR signal back toward the center of the frequency change time period. The range of frequency from the center frequency is determined by the low frequency oscillator 330. The output signal from this oscillator, which is applied through the flip flop 332, is integrated by the generator or integrating means 346 and thus produces a constant variation in the frequency of the oscillator 304. The output signal obtained at the readout terminal 306 is a signal which is measured to determine the average frequency thereof. Due to nonlinearities in the diodes 266 and 275, the output signal will not be quite symmetrical on either side of the actual resonant frequency of the material in 14. As the variation in frequency of oscillation of oscillator 304 is decreased, the accuracy of the readout is increased since the nonlinearity of the diodes are reduced in effect. Since this automatic frequency control depends upon the unsymmetrical output of the flip flop 350 and since it is not measuring the differences in time between the start of the change in frequency to the time of resonance, the variation in frequency can be reduced to the frequency immediately around the point of resonance. Thus the total frequency change can be just slightly more than one line width of resonance. A line width is defined in the art as the change in frequency necessary to proceed from a stated percentage of the amplitude of the resonant pulse at the start of resonance to the frequency at which the same ampltiude occurs on the trailing edge of the resonant pulse.

For simplified operation, the search circuitry and detection circuitry comprising the detection circuit 358, the amplifier 384 and the OR circuit 394 can be eliminated thereby producing a lower cost unit. Whenever the NMR signal is lost, the output of the integrating circuit utilizing amplifier 444 will reduce to zero and the control knob 300 can be adjusted until a signal is again obtained as observed on the oscilloscope 314. An even simpler circuit can be obtained if the detection circuit 404 is removed and replaced by the shorting wire in FIGURE 6 and the switch 452 is used. Without the detection and polarity inserting circuit 404, the integrating circuit using amplifier 444 will increase in signal amplitude to a maximum of one polarity or another depending upon the output of the flip flop 350 when the resonance signal is lost. This increase will produce a constant error in the frequency of oscillation of the oscillator 304. By shorting the output terminal 446 to ground 370 with the switch 452, this error signal is eliminated and the control 300 can be adjusted until an output is again observed on the oscilloscope 314. At this point the switch 452 can be released and the system will function automatically until the NMR signal is again lost for one reason or another.

While the integrating circuits were described as using the D.C. amplifier shown in the Philco data sheet previously mentioned, it is not intended that this be the only type of integrating circuit that can be used in this invention. On the contrary any good integrating circuit can be used for the boxes 444 and 346. The integrator using the amplifier 384 must be able to work having a constant error input signal but this is easily accomplished by standard design procedure. The integrator 346 can also be of the type described in connection with amplifier 384. It is not intended that the detection circuits 358 and 404 need to be the specific type shown in FIGURE 4 and are only included as one means of obtaining the result desired.

While a Colpitts oscillator has been shown and described for FIGURES 1 and 4, it is not intended that the type of oscillator be limited to a Colpitts since any oscillator can be used which can be frequency modulated to provide the frequency control needed for this invention. It is also not intended that the diode 275 of the oscillator shown in FIGURE 3 be restricted to the single placement shown. Two examples of variations in placement of the diode 275 are that it can be connected directly to the base of the transistor 183 and be in series with the capacitor 175 or it can be connected on the other side of the capacitor 175.

Additionally it is not intended that this invention be limited to magnetic resonance as shown in FIGURES 1 and 4 since the same circuit can be used to detect electric quadrupole moment resonance which does not depend upon a magnetic field but only upon electric field produced by the nuclei in the material 14 upon the application of the proper frequency signal. The invention described in FIGURE 1 and FIGURE 4 lie in the automatic frequency control circuit and additionally in the features of automatic scanning in the event the signal is lost with the added feature of a very accurate system of obtaining a readout signal. Additionally the invention lies in the possibility of obtaining a very simple nuclear resonance circuit as described in FIGURE 4 by leaving out the optional components and providing a very inexpensive unit.

Therefore in view of the above, I wish to be limited only by the appended claims.

What is claimed is:
1. In variable frequency oscillator apparatus:
valve means including first means, second means and third means;
first capacitive means connected between said first means and said second means of said valve means;
first terminal means;
second terminal means connected to said third means of said valve means;
variable resonant frequency circuit means connected between said first means of said valve means and said first terminal means;
second capacitive means including first and second leads, said first lead being connected to said second means of said valve means;
voltage variable capacitance means connected between said second lead of said second capacitive means and said first terminal means;
third terminal means connected to said second means of said valve means;
input means for supplying an input control signal connected to said second lead of said second capacitive means;
and output means connected to said second means of said valve means to supply an output signal therefrom which changes in frequency as a function of the characteristics of said variable resonant frequency circuit means.

2. In variable frequency oscillator apparatus:
valve means including first means, second means and third means;
first capacitive means connected between said first means and said second means of said valve means;
first terminal means;
second terminal means connected to said third means of said valve means;
tank circuit means connected between said first means of said valve means and said first terminal means;
second capacitive means including first and second leads, said first lead being connected to said second means of said valve means;
first voltage variable capacitance means connected between said second lead of said second capacitive means and said first terminal means;
third capacitive means including first and second leads, said first lead being connected to said first means of said valve means;
second voltage variable capacitance means connected between said second lead of said third capacitive means and said first terminal means;
third terminal means connected to said second means of said valve means;
input means for supplying an input control signal connected to said second leads of said second and third capacitive means;
and output means connected to said second means of said valve means to supply an output signal therefrom which changes in frequency as a function of the control signal applied to said input means.

3. In variable frequency oscillator apparatus:
transistor means including base means, emitter means and collector means;
first capacitance means connected between said base means and said emitter means of said transistor means;
first reference potential terminal means;
second power terminal means connected to said collector means of said transistor means;
inductive means connected between said base means of said transistor means and said first terminal means;
mechanically variable capacitive means connected between said base means of said transistor means and said first terminal means;
second capacitive means including first and second leads, said first lead being connected to said emitter means of said transistor means;
voltage variable semiconductor diode capacitance means connected between said second lead of said second capacitive means and said first terminal means;
third power terminal means connected to said emitter means of said transistor means;
input means for supplying an input control signal connected to said second lead of said second capacitive means;
and output means connected to said emitter means of said transistor means to supply an output signal therefrom which changes in frequency as a function of the control signal applied to said input means.

4. In variable frequency oscillator apparatus:
valve means including first means, second means and third means;
first capacitive means connected between said first means and said second means of said valve means;

first terminal means;
second terminal means connected to said third means of said valve means;
inductive means connected between said first means of said valve means and said first terminal means;
second capacitive means including first and second leads, said first lead being connected to said second means of said valve means, said second capacitive means cooperating with said inductive means to form a circuit having resonant characteristics;
first voltage variable capacitance means connected between said second lead of said second capacitive means and said first terminal means;
third capacitive means including first and second leads, said first lead being connected to said first means of said valve means;
second voltage variable capacitance means connected between said second lead of said third capacitive means and said first terminal means;
third terminal means connected to said second means of said valve means;
input means for supplying an input control signal connected to said second leads of said second and third capacitive means;
and output means connected to said second means of said valve means to supply an output signal therefrom which changes in frequency as a function of the control signal applied to said input means.

5. In variable frequency oscillator apparatus:
transistor means including base means, emitter means and collector means;
first capacitive means connected between said base means and said emitter means of said transistor means;
first reference potential terminal means;
second power terminal means connected to said collector means of said transistor means;
inductive means connected between said base means of said transistor means and said first terminal means;
mechanically variable capacitive means connected between said base means of said transistor means and said first terminal means;
second capacitive means including first and second leads, said first lead being connected to said emitter means of said transistor means;
first voltage variable semiconductor diode capacitance means connected between said second lead of said second capacitive means and said first terminal means;
third capacitive means including first and second leads, said first lead being connected to said base means of said transistor means;
second voltage variable semiconductor diode capacitance means connected between said second lead of said third capacitive means and said first terminal means;
third power terminal means connected to said emitter means of said transistor means;
input means for supplying an input control signal connected to said second leads of said second and third capacitive means;
and output means connected to said emitter means of said transistor means to supply an output signal therefrom which changes in frequency as a function of the control signal applied to said input means.

6. In nuclear resonant indicating apparatus:
nuclei containing material having a nuclear resonant frequency when placed in a non-modulated magnetic field of appropriate strength to define a resonant condition thereof and being adaptable for placement in a substantially constant magnetic field;
first means connected in operable relation to said nuclei containing material, said first means providing a periodically modulated high frequency field to said material for periodically inducing the resonant condition in said material;
second means connected to said first means, said second means providing an output pulse upon occurrence of nuclear resonance of said nuclei;
third means for providing a digital output indicative of the frequency at which nuclear resonance occurs;
fourth means connecting said second means to said third means for supplying the output pulse to said third means; and
automatic search means connected to said second means for detecting the absence of a periodical occurrence of said output pulse, said automatic search means also being connected to said first means for increasing the range of modulation of the field applied to said material until said output pulse indicating nuclear resonance is again detected.

7. In nuclear resonant apparatus:
variably adjustable means for generating a radio frequency field;
first means connected to said variably adjustable means for cyclically modulating the frequency of said radio frequency field to define a time modulation period such that the condition of nuclear resonance is periodically attained for the nuclei under test;
second means connected to said variably adjustable means for generating an output pulse indicating each occurrence of nuclear resonance;
third means connected to said first means, said third means generating a square wave pulse having a time equal to the time difference between a reference point in said time modulation period and the occurrence of nuclear resonance;
fourth means connected to said third means, said fourth means converting said square wave pulse into a reference voltage;
fifth means connected to said fourth means and further connected to said variably adjustable means, said fifth means changing the frequency of said variably adjustable means in accordance with changes in said reference voltage; and
sixth means connected to said second means for receiving output pulses therefrom and further connected to said variably adjustable means, said sixth means providing a scanning input signal to said variably adjustable means in the absence of output pulses being received from said second means.

8. In nuclear magnetic resonant apparatus:
first means for generating a magnetic field;
nuclei containing material situated within the magnetic field;
variably adjustable means for generating a radio frequency field, said variably adjustable means operatively connected to said nuclei containing material to subject the nuclei to the radio frequency field;
second means connected to said variably adjustable means for cyclically modulating the frequency of said radio frequency field to define a time modulation period such that the condition of nuclear magnetic resonance is periodically attained for the nuclei under test;
third means connected to said variably adjustable means for generating an output pulse for each occurrence of nuclear resonance;
fourth means connected to said second means for generating a square wave pulse having a time equal to the time difference between a reference point and the time modulation period and the occurrence of nuclear resonance;
fifth means connected to said fourth means, said fifth means converting said square wave pulse generated by said fourth means into a reference voltage;
sixth means connected to said fifth means and further connected to said variably adjustable means for changing the frequency of said variably adjustable means in response to changes in said reference voltage supplied by said fifth means; and seventh means connected to said third means and to said variably adjustable means for providing a scanning input signal to said variably adjustable means in the absence of receipt of output pulses from said third means indicating the occurrence of nuclear resonance.

9. In nuclear resonant sensing apparatus:

material means having a nuclear resonant frequency;

variable high frequency signal producing means positioned to subject said material means to said high frequency signal;

detector means connected to said variable high frequency signal producing means for providing an output signal for each occurrence of nuclear resonance;

first means for providing a reference pulse;

second means connected to said first means and to said detector means for receiving the reference and the output signal therefrom respectively, said second means providing a reference signal indicative of a time differential between said reference pulse and said output signal of said detector means;

third means connected to said second means and to said variable high frequency signal producing means for varying the frequency of said variable high frequency signal producing means in accordance with said reference signal;

fourth means for providing a search signal;

switching means operatively connected for receiving the output signal from said detector means and further connected to said fourth means and to said variable high frequency signal producing means, said switching means connecting said fourth means to said variable high frequency signal producing means for supplying the search signal thereto until output signals are received from said detector means due to the occurrence of nuclear resonance in said material means; and fifth means connected to said variable frequency signal producing means for providing an output indicative of the frequency at which nuclear resonance occurs.

10. In apparatus for detecting the frequency at which nuclear resonance occurs:

first means containing nuclei which resonate at a frequency dependent upon the environment;

variable high frequency oscillator means operatively attached to said first means for providing a high frequency signal to said nuclei of said first means;

low frequency oscillator means connected to said variable high frequency oscillator means for frequency modulating said variable high frequency oscillator means;

second means connected to said variable high frequency oscillator means for providing a first output pulse upon each occurrence of nuclear resonance of said nuclei;

third means for providing a time reference output pulse;

first gating means connected to said third means for receiving said time reference pulse therefrom and connected to said second means for receiving said first output pulse therefrom, said first gating means providing a second output pulse when said time reference pulse and said first output pulse are received coincidentally;

clock pulse generating means;

second gating means operatively connected to said first gating means, said third means, and said clock pulse generating means for providing a square wave output pulse of a width proportional to the time difference between the occurrence of said time reference pulse in conjunction with said clock pulse and said second output pulse in conjunction with said clock pulse;

integrating means connected to said second gating means, said integrating means providing an output signal indicative in amplitude of the width of said square wave output pulse, and said integrating means further being connected to said variable high frequency oscillator for adjusting the frequency of said variable high frequency oscillator so as to provide a square pulse of a predetermined width from said first gating means;

indicating means connected to said variable high frequency oscillator means for providing an output indicative of the frequency at which resonance occurs in said first means;

fourth means for providing a search signal; and automatic search means connected to said first gating means, said fourth means, and said variable high frequency oscillator means for applying a search signal to frequency modulate said variable high frequency oscillator means whenever there is an absence of output pulses from said first gating means for greater than a predetermined amount of time.

11. In nuclear resonant indicators:

variable frequency field producing means for producing nuclear resonance in a nuclei containing material;

detection means connected to said variable frequency field producing means for providing a first output pulse upon each occurrence of nuclear resonance in the material;

first means for providing a second output pulse;

gating means connected to said detection means and said first means for receiving said first and second output pulses therefrom, said gating means providing a third output pulse upon concurrent reception of said first and second output pulses;

second means connected to said first means and to said gating means for receiving said second output pulse and said third output pulse therefrom, said second gating means providing a fourth output pulse dependent in width upon the time differential between said second and third pulses; and integrating means connected to said second means for receiving said fourth output pulses therefrom and connected to said variable frequency field producing means, said integrating means supplying said variable frequency field producing means with an output signal indicative of the width of said fourth output pulse for varying the frequency of said variable frequency field producing means in accordance with the width of said fourth output pulse for the purpose of restoring the fourth output pulse toward a predetermined width.

12. In nuclear resonant indicators:

variable frequency field producing means for producing nuclear resonance in a material;

detection means connected to said variable frequency field producing means for providing a first output pulse upon each occurrence of nuclear resonance;

first means for providing a second output time reference pulse;

gating means connected to said detection means and said first means for receiving said first and second output pulses therefrom, said first means providing a third output pulse upon concurrent conception of said first and second output pulses;

second means connected to said first means and to said gating means for receiving said second and third pulses therefrom, said second means providing a fourth output pulse dependent in width upon the time differential between said second and third pulses;

integrating means operatively connected between said second means and said variable frequency field producing means, said integrating means supplying said variable frequency field producing means with an output signal indicative of the width of said fourth output pulse, said output signal from said integrating means varying the frequency of said variable frequency field producing means in accordance with the width of the fourth output pulse for the purpose of restoring the fourth output pulse toward a predetermined width; and means operatively connected to said variable frequency field producing means for providing an indication of the frequency at which nuclear resonance occurs.

13. In apparatus for detecting the frequency at which nuclear resonance occurs:

first means containing nuclei which resonate at a frequency dependent upon the environment;

variable high frequency oscillator means operatively connected to said first means for providing a high frequency signal to said nuclei of said first means;

low frequency oscillator means connected to said variable high frequency oscillator means for frequency modulating said variable high frequency oscillator means;

second means connected to said variable high frequency oscillator means, said second means providing a first output pulse upon each occurrence of nuclear resonance of said nuclei;

phase shifting means connected to said low frequency oscillator means for receiving a signal therefrom, said phase shifting means providing a time reference output pulse;

first gating means connected to said second means and to said phase shifting means for receiving the first output pulse and the time reference output pulse therefrom, said first gating means providing a second output pulse when said time reference pulse and said output pulse are received coincidentally;

clock pulse generating means;

second gating means connected to said phase shifting means, said pulse generating means, and said first gating means for receiving signals therefrom, said second gating means providing a square wave output pulse of a width proportional to the time difference between the occurrence of said time reference pulse in conjunction with said clock pulse and said second output pulse in conjunction with said clock pulse;

integrating means operatively connected between said second gating means and said variable frequency oscillator means, said integrating means supplying said variable frequency oscillator means with a signal indicative of the width of said square wave output pulse from said second gating means for correcting the frequency of said variable high frequency oscillator signal to provide a square wave pulse of a predetermined width from said second gating means; and indicating means connected to said variable high frequency oscillator means for providing an output indicative of the frequency at which resonance occurs.

14. In apparatus for detecting the frequency at which nuclear resonance occurs:

first means containing nuclei which resonate at a frequency dependent upon the environment;

variable frequency oscillator means operatively connected to said first means for providing a high frequency to said nuclei containing said first means;

low frequency oscillator means connected to said variable high frequency oscillator means modulating said variable high frequency oscillator means;

second means connected to said variable high frequency oscillator means for receiving a signal therefrom, said second means providing a first output pulse upon each occurrence in nuclear resonance of said nuclei;

phase shifting means connected to said low frequency oscillator means for providing a time reference output pulse with respect to a signal received from said low frequency oscillator means;

first gating means connected to said phase shifting means and to said second means for receiving signals therefrom, said first gating means providing a second output pulse when said time reference pulse and said first output pulse are received coincidentally;

clock pulse generating means;

second gating means connected to said phase shifting means, said pulse generating means, and said first gating means for receiving signals therefrom, said second gating means providing a square wave output pulse of a width proportional to the time difference between the occurrence of said time reference pulse in conjunction with said clock pulse and second output pulse in conjunction with said clock pulse;

integrating means operatively connected between said second gating means and said variable high frequency oscillator means, said integrating means providing an output signal indicative in amplitude of the width of said square wave output pulse to said variable high frequency oscillator means for correcting the frequency of said variable high frequency oscillator signal to provide a square wave pulse of a predetermined width from said second gating means;

third gating means connected to said variable high frequency oscillator and to said first gating means, said third gating means providing a gating output signal at the time nuclear resonance occurs in said nuclei containing first means, said gated output signal containing a high frequency component which has substantially the same as the resonant frequency of said nuclei; and indicating means connected to said third gating means for receiving therefrom said gated output signal, said indicating means providing a visual output indicative of the high frequency component in said gated signal.

15. In apparatus for detecting the frequency at which nuclear resonance occurs:

first means containing nuclei which resonate at a frequency dependent upon the environment;

variable high frequency oscillator means operatively connected to said first means for providing a high frequency signal to said nuclei of said first means;

low frequency oscillator means connected to said variable high frequency oscillator means for frequency modulating said variable high frequency oscillator means;

second means connected to said variable high frequency oscillator means, said second means providing a first output pulse upon each occurrence of nuclear resonance of said nuclei in said first means;

phase shifting means connected to said low frequency oscillator means, said phase shifting means providing a time reference output pulse with respect to a signal received from said low frequency oscillator means;

first gating means connected to said phase shifting means and to said second means for receiving signals therefrom, said first gating means providing a second output pulse when said time reference pulse and said first output pulse are received coincidentally;

clock pulse generating means;

second gating means connected to said phase shifting means, said clock pulse generating means, and said first gating means, said second gating means providing a square wave output pulse of a width proportional to the time difference between the occurrence of said time reference pulse in conjunction with said clock pulse and said second output pulse in conjunction with said clock pulse;

integrating means operatively connected between said second gating means and said variable high frequency oscillator means, said integrating means supplying a signal to said variable high frequency oscillator means indicative in amplitude of the width of said square wave output pulse for correcting the frequency of said variable high frequency oscillator signal to provide a square wave pulse of predetermined width from said second gating means;

third gating means connected to said variable high frequency oscillator means and to said first gating means, said third gating means providing a gated output signal at the time nuclear resonance occurs in said nuclei containing said first means, and said gated output signal containing a high frequency component which is substantially the same as the resonant frequency of said nuclei; and indicating means connected to said third gating means for receiving said gated output signal therefrom, said indicating means providing a visual output indicative of the high frequency component in said gated signal.

16. In nuclear resonant indicators:

first means for subjecting a material to a field of varying frequency;

detection means connected to said first means, said detection means providing a first output pulse upon each occurrence of nuclear resonance;

second means for providing a second output pulse;

gating means connected to said detection means and said second means for receiving said first and second output pulses therefrom, said second means providing a third output pulse upon concurrent conception of said first and second output pulses, the width of said third pulse being indicative of the time spacing between consecutive first output pulses;

integrating means operatively connected between said gating means and said first means, said integrating means supplying a signal to said first means indicative of the width of said third output pulse for varying the frequency of said first means in accordance with the width of said third pulse for the purpose of restoring the third output pulse toward a predetermined width; and output means connected to said first means for providing an output indicative of the average frequency of oscillation of said variable frequency field producing means.

17. Nuclear resonance detecting apparatus comprising, in combination:

first means for subjecting a material to a field of varying frequency;

first detection means connected to said first means, said first detection means providing a pulse type first output signal upon each occurrence of nuclear resonance;

generating means for providing a second output signal;

logic means connected to said first detection means and to said generating means, said logic means providing a pulse width modulated third signal, the width of said third signal being indicative of the time interval between successive first signal pulses;

second detection means connected to said logic means for receiving said third signal therefrom, said second detection means providing a fourth output signal indicative of an alternating component of said third signal;

second means connected to said generating means and to said second detection means, said second means providing a fifth output signal representative of said second signal and an integral of said fourth signal; and third means connecting said second means to said first means for applying said fifth output signal to said first means for modulating the frequency of the field being applied to the material.

18. Nuclear resonance detecting apparatus comprising, in combination:

first means for subjecting a material to a field of varying frequency;

detection means connected to said first means for providing a pulse type first output signal upon each occurrence of nuclear resonance;

generating means for providing a second signal;

logic means connected to said detection means and to said generating means, said logic means providing pulse width modulated third signal whose width is indicative of the time interval between successive first output signal pulses;

second means connected to said detection means and to said logic means, said second means providing a fourth output signal representative of said second signal and representative of an integral of said third signal;

switching means operatively connected to said second means for reducing the effect of the integral of said second signal as it affects the magnitude of said fourth output signal; and third means connecting said second means to said first means for applying said fourth output signal to said first means to modulate the frequency of the field.

19. In nuclear resonance detecting apparatus:

variable frequency oscillator means including input means, control means and output means, said oscillator means providing a first output signal of an amplitude indicative of a resonant condition;

first circuit means for containing nuclei which resonate at a frequency dependent upon external conditions;

first means connecting said first circuit means to said input means of said variable frequency oscillator means;

second means connected to said variable frequency oscillator means, said second means providing a shaped pulse type second output signal suitable for operating gating circuitry;

signal producing means for producing a third output signal;

phase splitting means connected to said signal producing means, said phase splitting means providing fourth and fifth output signals, said fourth and fifth signals being of opposite phases;

logic circuit means connected to second means and to said phase splitting means, said logic means providing pulse type sixth and seventh output signals in alternate time periods, said sixth and seventh output signals occurring upon concurrent conception of said second and fourth and said second and fifth signals respectively;

flip-flop means connected to said logic means for receiving said sixth and seventh output signals therefrom, said flip-flop means providing a pulse width modulated eighth output signal which changes in amplitude upon each alternate reception of said sixth and seventh output signals;

second circuit means connected to said flip-flop means, said second circuit means providing a ninth output signal indicative of the amount of modulation of said eighth output signal;

switching means operatively connected to provide a means to short said ninth output signal to a reference potential;

third circuit means connected to said phase splitting means for providing a tenth output signal;

summing means connected to said second circuit means and to said third circuit means, said summing means providing an eleventh output signal indicative of said ninth and tenth output signal;

third means connecting said summing means to said variable frequency oscillator means for applying said eleventh output signal thereto, said eleventh output signal varying the frequency of oscillation of said variable frequency oscillator means in accordance with the amplitude of said eleventh output signal; and fourth means connected to said variable frequency oscillator means for providing an output indicative of the frequency of oscillation of said variable frequency oscillator means.

20. In nuclear resonance detecting apparatus:

variable frequency oscillator means including input means, control means and output means, said oscillator means providing a first output signal of an amplitude indicative of the impedance presented by a load connected to said input means;

circuit means connected to said input means of said variable frequency oscillator means, said circuit means including nuclei which resonate at a frequency dependent upon external conditions;

first detector means connected to said circuit means for receiving said first output signal therefrom, said first detector means providing a second signal indicative of the amplitude of said first output signal;

shaping means connected to said first detector means for receiving said second signal therefrom, said shaping means providing a shaped pulse type third output signal suitable for operating gating circuitry;

low frequency signal producing means for producing a fourth output signal;

phase splitting means connected to said low frequency signal producing means for receiving said fourth output signal therefrom, said phase splitting means providing fifth and sixth output signals, said fifth and sixth output signals being of opposite phases;

first AND circuit means connected to said shaping means and to said phase splitting means for receiving said third and fifth output signals therefrom, said first AND circuit means providing a pulse type seventh output signal upon simultaneous reception of said third and fifth output signals;

second AND circuit means connected to said shaping means and said phase splitting means, said sixth AND circuit means providing a pulse type eighth output signal upon simultaneous reception of said third and sixth output signals;

flip-flop means connected to said second AND circuit means, said flip-flop means providing a ninth output signal which changes in amplitude upon alternate reception of said seventh and eighth output signals;

first integrating means connected to said flip-flop means, said first integrating means providing a tenth output signal which is an integral of said ninth output signal;

normally opened switching means connected to provide a means to short said tenth output signal to a reference potential;

second integrating means connected to said phase splitting means for receiving said sixth output signal therefrom, said second integrating means providing a shaped eleventh output signal;

summing means connected to said first and second integrating means, said summing means providing a twelfth output signal indicative of said tenth and eleventh output signals;

means connecting said summing means to said variable frequency oscillator means for varying the frequency of oscillation thereof in accordance with the amplitude of said twelfth output signal; and means connected to said control means of said variable frequency oscillator means for providing an output indicative of the frequency of oscillation of said oscillator means.

21. In nuclear resonance detecting apparatus:

variable frequency oscillator means including input means, control means and output means, said oscillator means providing a first output signal of an amplitude indicative of the impedance presented by a load connected to said input means;

tank circuit means connected to said input means of said variable frequency oscillator means, said tank circuit means including nuclei which resonate at a frequency dependent upon external conditions;

first detector means connected to said variable frequency oscillator means, said first detector means providing a second signal indicative of the amplitude of said first output signal;

shaping means connected to said first detector means, said shaping means providing a shaped pulse type third output signal suitable for operating gated circuitry;

low frequency signal producing means for producing a fourth output signal;

phase splitting means connected to said low frequency signal producing means, said phase splitting means providing fifth and sixth output signals, said fifth and sixth signals being of opposite phases;

first AND circuit means connected to said shaping means and to said phase splitting means, said first AND circuit means providing a pulse type seventh output signal upon simultaneous reception of said third and fifth output signals;

second AND circuit means connected to said shaping means and said phase splitting means, said second AND circuit means providing a pulse type eighth output signal upon simultaneous reception of said third and sixth output signals;

flip-flop means connected to said first AND circuit means and to said second AND circuit means, said flip-flop means providing a ninth output signal which changes in amplitude upon each alternate reception of said seventh and eighth output signals;

second detector means connected to said flip-flop means, said second detector means providing a tenth output signal when said ninth signal is varying in amplitude;

first integrating means connected to said second detector means, said first integrating means providing an eleventh output signal indicative of an integral of said tenth output signal;

normally opened shorting means connected to provide a means to short said eleventh output signal to a reference potential;

second integrating means connected to said phase splitting means for receiving said sixth output signal therefrom, said second integrating means providing a triangular shaped twelfth output signal;

summing means connected to said first and second integrating means, said summing means providing a thirteenth output signal indicative of said eleventh and twelfth output signals;

means connecting said summing means to said variable frequency oscillator means for applying said thirteenth output signal thereto, said oscillator means varying in frequency of oscillation in accordance with the amplitude of said thirteenth output signal; and means connected to said variable frequency oscillator means for providing an output indicative of the frequency of oscillation of said oscillator means.

22. In nuclear resonance detecting apparatus:

variable frequency oscillator means including input means, control means and output means, said oscillator means providing a first output signal of an amplitude indicative of the impedance presented by a load connected to said input means;

tank circuit means connected to said input means of said variable frequency oscillator means, said tank circuit means including nuclei which resonate at a frequency dependent upon external conditions;

first detector means connected to said variable frequency oscillator means, said first detector means providing a second signal indicative of the amplitude of said first output signal;

shaping means connected to said first detector means, said shaping means providing a shaped pulse type third output signal suitable for operating gating circuitry;

low frequency signal producing means for providing a fourth output signal;

phase splitting means connected to said low frequency signal producing means, said phase splitting means providing fifth and sixth output signals, said fifth and sixth signals being of opposite phases;

first AND circuit means connected to said shaping means and to said phase splitting means, said first AND circuit means providing a pulse type seventh output signal upon simultaneous reception of said third and fifth output signals;

second AND circuit means connected to said shaping means and to said phase splitting means, said second AND circuit means providing a pulse type eighth output signal upon simultaneous reception of said third and sixth output signals;

normally opened switching means connected to short said eleventh output signal to a reference potential in the absence of said second signal;

second integrating means connected to said phase splitting means, said second integrating means providing a triangular shaped twelfth output signal;

first means for supplying a search signal;

logic means connected to said flip-flop means and to said first means, said logic means providing a thirteenth output signal similar to said search signal whenever the signal from said flip-flop means remains at a constant amplitude longer than the predetermined time;

summing means connected to said first and second integrating means and to said logic means, said summing means providing a fourteenth output signal indicative of said eleventh, said twelfth and said thirteenth output signals;

means connecting said summing means to said variable frequency oscillator means for varying the frequency of oscillation of said variable frequency oscillator means in accordance with the amplitude of said fourteenth output signal; and means connected to said variable frequency oscillator means for providing an output indicative of the frequency of oscillation of said variable frequency oscillator means.

23. In nuclear magnetic resonance detecting apparatus:

variable frequency marginal oscillator means including input means, control means and output means, said oscillator means providing a first output signal of an amplitude indicative of the impedance presented by a load connected to said input means;

tank circuit means connected to said input means of said variable frequency oscillator means, said tank circuit means including nuclei which resonate at a frequency dependent upon external conditions;

first detector means connected to said variable frequency marginal oscillator means, said first detector means providing a second signal indicative of the amplitude of said first output signal;

shaping means connected to said first detector means, said shaping means providing a shaped pulse type third output signal suitable for operating gating circuitry;

low frequency signal producing means providing a fourth output signal;

phase splitting means connected to said low frequency signal producing means, said phase splitting means providing fifth and sixth output signals, said fifth and sixth output signals being of opposite phases;

first AND circuit means connected to said shaping means and to said phase splitting means, said first AND circuit means providing a pulse type seventh output signal upon simultaneous reception of said third and fifth output signals;

second AND circuit means connected to said shaping means and to said phase splitting means, said second AND circuit means providing a pulse type eighth output signal upon simultaneous reception of said third and sixth output signals;

flip-flop means connected to said first and second AND circuit means, said flip-flop means providing a ninth output signal which changes in amplitude upon each alternate reception of said seventh and eighth output signals;

second detector means connected to said flip-flop means, said second detector means providing a tenth output signal when said ninth signal is varying in amplitude;

first integrating means connected to said second detector means, said first integrating means providing an eleventh output signal;

normally open switching means connected for providing a short circuit of said eleventh output signal to a reference potential when said third output signal is not being received by said first and second AND circuit means;

second integrating means connected to said phase splitting means, said second integrating means providing a triangular shaped twelfth output signal;

third detecting means connected to said flip-flop means, said third detecting means providing a thirteenth output signal whenever said signal being received from said flip-flop means remains at a constant amplitude longer than a predetermined amount of time;

third integrating means connected to said third detecting means, said third integrating means providing a fourteenth output signal unless said thirteenth signal is being received;

means for supplying a search signal;

logic means connected to said third integrating means and to said means for supplying a search signal, said logic means providing a fifteenth output signal similar to said search signal whenever said fourteenth signal is not being received;

summing means connected to said first integrating means, said second integrating means, and said logic means, said summing means providing a sixteenth output signal indicative of said eleventh, twelfth, and said fifteenth output signals;

means connecting said summing means to said variable frequency marginal oscillator means for varying the frequency of oscillation thereof in accordance with the amplitude of said sixteenth output signal; and means connected to said variable frequency marginal oscillator means for providing an output indicative of the frequency of oscillation of said marginal oscillator means.

24. In nuclear resonance indicating apparatus:

nuclei containing material having a nuclear resonant frequency when placed in a non-modulated magnetic field of appropriate strength to define a resonant condition thereof;

variable frequency oscillator means including coil means encompassing said nuclei containing material, said variable frequency oscillator means providing a periodically modulated high frequency field to said material for inducing the resonant condition in said material and providing a first output signal upon occurrence of nuclear resonance of said nuclei;

first means connected to said variable frequency oscillator means for providing an output indicative of the frequency at which nuclear resonance occurs;

second means for supplying a time reference signal;

logic means connected to said variable frequency oscillator means and said second means, said logic means supplying a second output signal indicative of a time differential between said first output signal and said time reference signal; and third means connecting said logic means to said variable frequency oscillator means for varying the frequency of said variable frequency oscillator means to maintain a predetermined time differential between said time reference signal and said first output signal.

References Cited by the Examiner

UNITED STATES PATENTS

| | | | |
|---|---|---|---|
| 2,772,391 | 11/59 | Mackey | 324—0.5 |
| 2,912,641 | 11/59 | Ruble | 324—0.5 |
| 2,984,794 | 5/61 | Carter et al. | 331—117 |
| 3,039,045 | 6/62 | Bell | 324—0.5 |
| 3,084,294 | 4/63 | Vallese | 333—109 |
| 3,099,793 | 7/63 | Rinkley | 324—0.5 |

OTHER REFERENCES

Nolle et al.: The Review of Scientific Instruments, vol. 28, No. 11, November 1957, pages 930–932 incl.

Bruin et al.: The Review of Scientific Instruments, vol. 31, No. 8, August 1960, page 909.

Horsfield et al.: Journal of Scientific Instruments, vol. 38, No. 8, August 1961, pages 322—324 incl.

CHESTER L. JUSTUS, *Primary Examiner.*

MAYNARD R. WILBUR, *Examiner.*